United States Patent Office 3,150,637
Patented Sept. 29, 1964

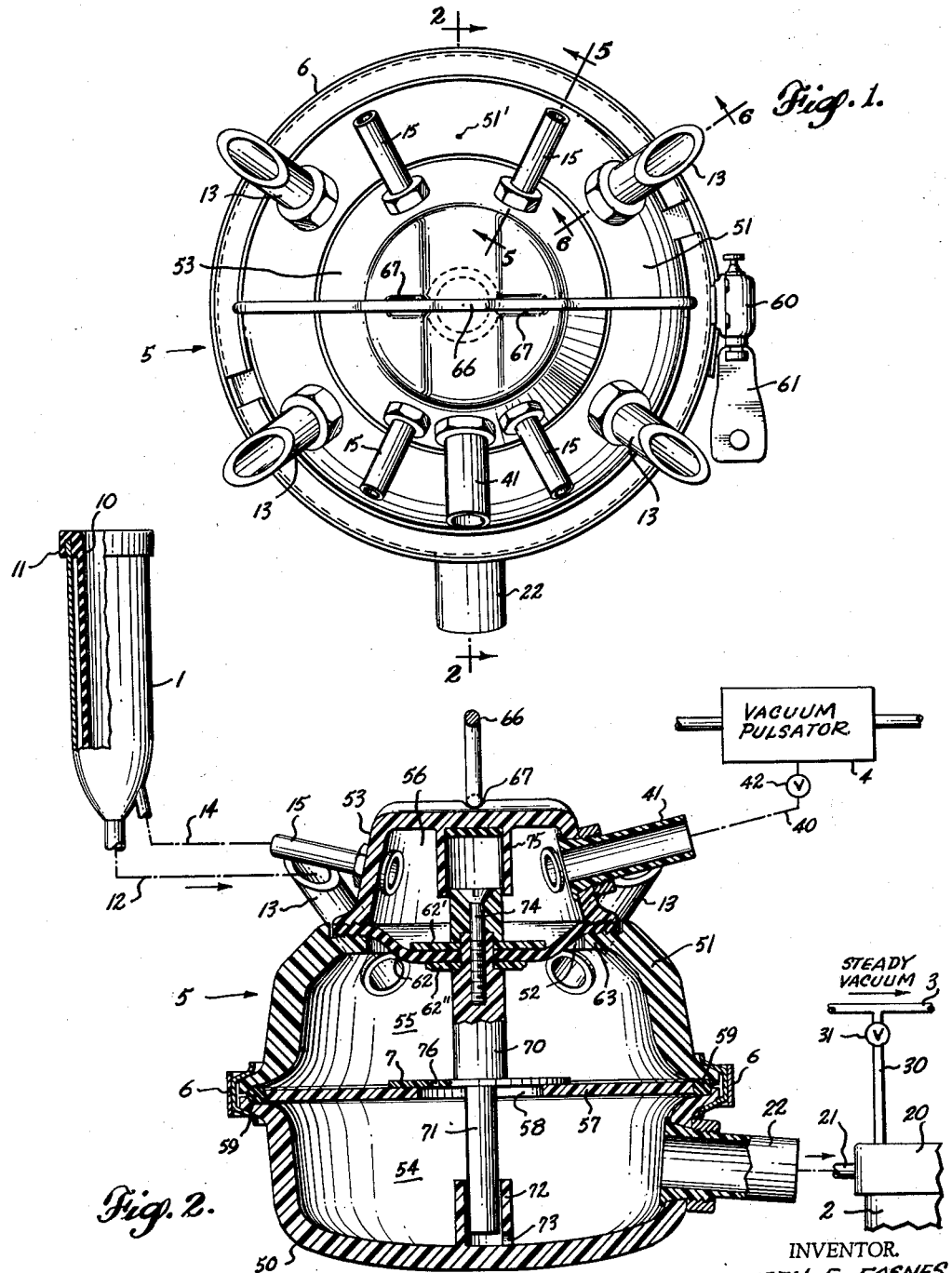

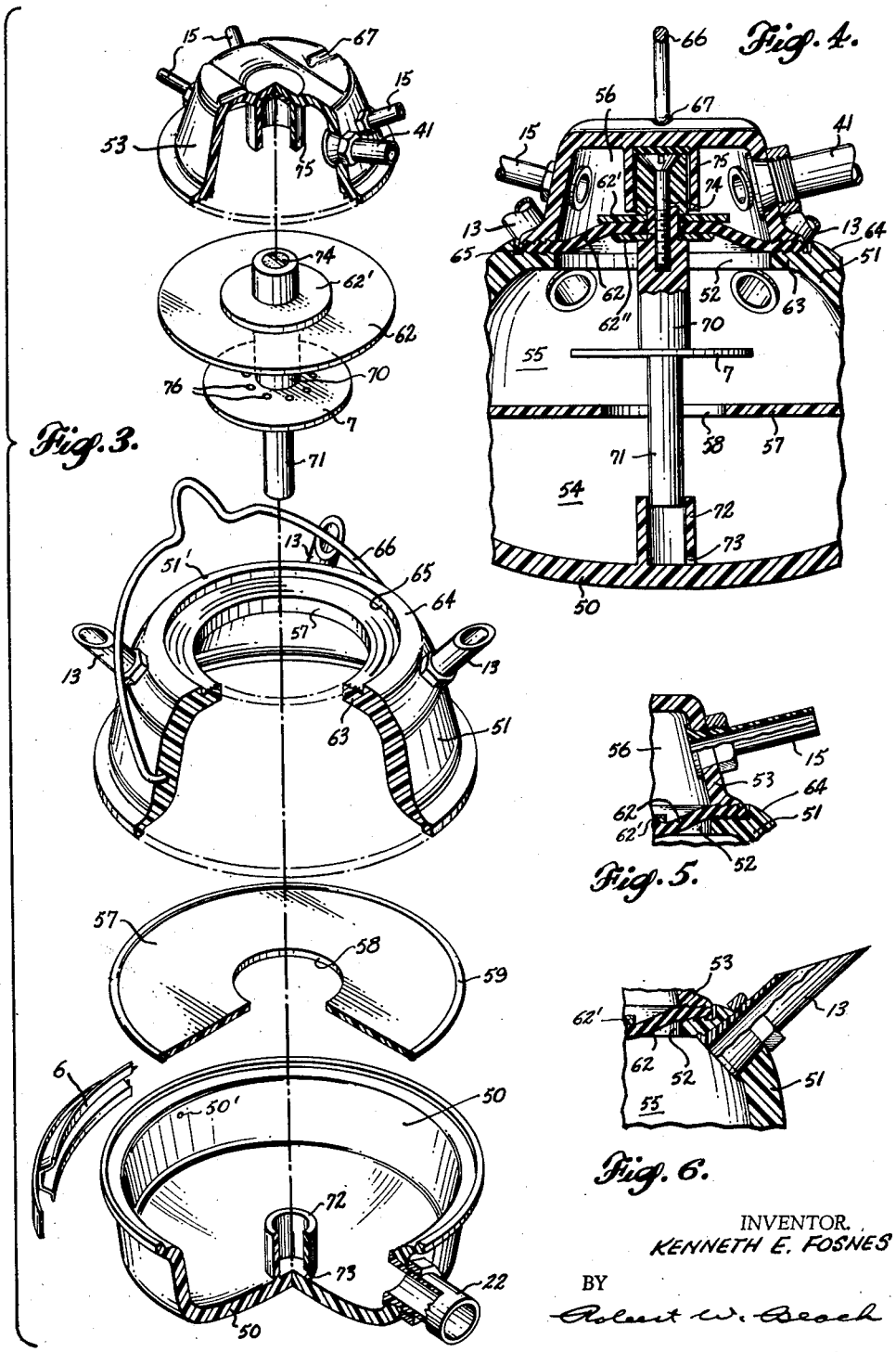

3,150,637
MILKING MACHINE MILKER
Kenneth E. Fosnes, 10602 NE. 26th, Bellevue, Wash.
Filed Jan. 29, 1963, Ser. No. 254,735
10 Claims. (Cl. 119—14.54)

This invention is concerned with apparatus for milking cows and particularly with that component of the apparatus which is interposed between a source of suction and the teat cups. This component, designated a milking machine milker, is connected by individual flexible tubes to the individual teat cups to apply suction to them, and to receive milk from them. Additionally, the milker is connected to a receiver for the milk withdrawn from the cow, to which receiver the milk is conveyed by suction, and to a source of pulsating vacuum used for controlling the operation of the milker. This application is a continuation-in-part of my prior application Serial No. 142,387 filed October 2, 1961, for a Milking Machine Manifold.

The modern tendency in dairying is toward mass production so that dairies have larger numbers of cows and it is difficult to obtain experienced personnel to milk the cows. Also, the tendency in modern dairying is toward bulk handling of milk in closed systems to improve sanitation. Consequently, milking machines frequently are connected to a milk storage tank by suitable piping without any manual handling and such milk is pumped from the storage tank into a tank truck and transported in bulk to a pasteurizing and bottling plant. Mechanical milking apparatus has therefore become virtually an indispensable part of the equipment of a modern dairy.

The theory of milking cows by mechanical apparatus, as distinguished from hand milking, is good but in practice it has been found that undesirable effects have been produced on the cows. The action of some milking apparatus is severe because it subjects the teats of a cow to prolonged suction and hard squeezing action which results in manipulating the teat to cause soreness and drawing blood into the teat tissue, causing congestion. Moreover, the hard squeezing action, coupled with the strong suction, tends to cause the muscles of the cow to become tense, restricting the discharge of milk instead of expediting it. For this reason the milking operation takes longer than it should and it is difficult for the milking apparatus to milk the cow dry.

Because of the abuse to which the teats of a cow are subjected by various types of mechanical apparatus, the teats are inclined to become inflamed and sore. The presence of this condition further increases the difficulty of milking the cow by mechanical apparatus. Moreover, the teats and udder of a cow may become infected, which condition is known as mastitis. The action of conventional milking apparatus is inclined to aggravate this unhealthy condition still further.

A principal object of the present invention is to provide mechanical milking apparatus for cows which will cause the teat cups to have a gentle action on the cows' teats, closely comparable to hand milking, so that the teats will not be abused and made sore or inflamed. In accomplishing this object the teats are not subjected continuously to a strong suction, but periods of strong suction without squeezing alternate with rest and fill periods during which gentle squeezing occurs. In the rest and fill periods the suction to which the teats are subjected is greatly reduced, but the squeeze is increased.

A further object is to eliminate the possibility of subjecting the teats of a cow to a prolonged steady, strong suction if the suction of the pulsating vacuum mechanism of the milking apparatus should fail for any reason.

It is also an object of this invention to increase the effectiveness of mechanical milking apparatus so as to reduce the time required for the milking operation, while at the same time increasing the efficiency of the milking action so that the cow in each instance will be milked dry by the apparatus itself, thus eliminating the necessity of resorting to a manual stripping operation to complete the milking. In this regard it is an object to render the entire milking operation more like that produced by hand milking, or by a suckling calf.

Another object is to provide milking apparatus which can be applied to a cow and subsequently removed quickly and easily, yet which during the milking operation will be held reliably attached to the cow and maintain a consistently uniform operation without attention by an attendant. It is not necessary to provide a stand for supporting the apparatus from the floor, or a surcingle for suspending the apparatus from the cow independently of the teat cups and their tubes connected to the milker.

Still a further object is to provide apparatus which is sanitary, both by being made of material which will not pollute the milk and by being constructed so that the milker can be disassembled quickly into components which can be washed and sterilized readily.

It is also an object to provide a milker having ample milk-receiving capacity to store milk temporarily and periodically as may be necessary to accommodate the increased milk flow obtained as a result of the use of the present apparatus. Milk will be discharged continuously from the milker to the milk receiver both during the periods of rest, when the teat cups are subjected to a suction of lower value, and during the milking periods.

Another object is to provide a milking apparatus milker which is compact, made of few parts and is comparatively inexpensive to manufacture.

These various objects can be accomplished by including in the milking apparatus a milker having a valve controlled by a steady suction and by a pulsating suction. Such suctions are also connected to teat cups of conventional type. The centers of the teat cups are subjected alternately to a strong suction and to a weak suction, and the milker is suspended from such teat cups. Preferably the milker includes two chambers of substantial size, one of which is connected to the teat cups and the other of which is connected to the milk line, and a valve interposed between such chambers controls the degree of communication between them. Such valve is moved alternately to increase the suction applied to the teat cups, when milk is discharged rapidly to the milk receiver, and to reduce the suction applied to the teat cups while milk continues to flow to the milk receiver. Such milker can be disconnected from the teat cups, the milk receiver and the suction sources quickly, and can be disassembled readily to enable all parts of the milker to be cleaned thoroughly with ease.

FIGURE 1 is a plan of the milking apparatus milker and FIGURE 2 is a central section through the milker on line 2—2 of FIGURE 1, in conjunction with a side elevation of a teat cup having parts broken away and diagrammatic illustrations of other elements of the milking apparatus shown connected diagrammatically to the milking machine milker.

FIGURE 3 is a top perspective of the milking machine milker with parts shown in exploded relationship and having portions broken away.

FIGURE 4 is a central section through the milking machine milker taken on line 2—2 of FIGURE 1 and corresponding to FIGURE 2, except that certain parts are shown in a different operative position and other parts are broken away.

FIGURE 5 is a detailed section through a fragment of the milking machine milker on line 5—5 of FIGURE 1, and FIGURE 6 is a detail section on line 6—6 of FIGURE 1 through another fragmentary portion of the milking machine milker.

As shown in FIGURE 2, milking apparatus is composed ordinarily of four principal components, namely, teat cups including an outer shell 1 and an inner flexible liner 10 capable of being drawn inward into squeezing engagement with a teat; a milk container 2 which may be either a bucket or a storage tank into which milk is drawn by suction from a vacuum line 3; a vacuum pulsator 4 and a milker 5 connected by flexible tubing to the teat cups, the milk container and the vacuum pulsator. Of this apparatus the teat cups, milk container vacuum source 3 and vacuum pulsator may be conventional, this invention being concerned only with the milker 5, provided that it is associated with suitable types of other components in the apparatus.

Usually the liner 10 of the teat cup in relaxed condition is somewhat smaller than the rigid shell 1 of the cup in which the liner is received so as to leave a small annular space between these two elements. The upper end of the liner is folded over the upper edge of the cup shell to provide a downwardly extending flange 11 for holding the liner in place relative to the rigid shell and to cushion engagement of the cup with the teat and udder of the cow. The lower end of the liner 10 is connected to one end of the flexible tube 12, the other end of which is connected to a nipple 13 projecting from the milking machine milker 5. Through this tube suction can be supplied to the teat cup within the liner 10 and milk can be withdrawn from the teat cup. In addition, one end of the flexible tube 14 is connected to an outer nipple of the teat cup which communicates with the space between the shell 1 and the liner 10. The other end of this tube is connected to a nipple 15 projecting from the upper portion of the milker 5.

For the steady vacuum line 3 any suitable suction source can be used, as is conventional with milking apparatus, and such vacuum line is connected by a pipe 30 to the milk container 2. A valve 31 is provided in the connection 30 which can close such connection so that the milk container will not be subjected to any suction when the apparatus is not in use for milking. In addition, the valve means may include a pressure regulator so that the suction to which the connection 30 is subjected is approximately 15 inches of mercury, or 7½ pounds per square inch.

The milk container 2 ordinarily will be a storage tank, although this container could be eliminated entirely and the milk could be taken by pipe line directly to a processing plant if desired. Alternatively, the container could be simply a milk bucket which preferably would be closed by the cover 20, although some other provision might be made for discharging from the pipe 21 connected to the cover milk drawn into such pipe.

Four teat cup tubes 12 are connected to the milker 5 and in order to provide alternate milking and rest periods it is necessary to have a pulsating suction, or vacuum, connection to each teat cup. For this purpose a vacuum pulsator 4 of conventional type is connected by a flexible tube 40 to a nipple 41 projecting from the milking machine milker 5. A valve 42 is interposed between the vacuum pulsator 4 and the nipple 41, which can be closed to sever the connection between the vacuum pulsator and the milker when that particular milker and its associated teat cups are not in use. Like the valve 31, valve 42 can include pressure regulating means also so that a pulsating vacuum having a suction of approximately 15 inches of mercury, or 7½ pounds per square inch, can be communicated through the milker 5 to the teat cups.

The milking machine milker 5 is illustrated in the drawings as being composed of three principal parts, namely, a base 50 in the form of a bowl, a domed cover 51 having a top opening 52 and a cap 53 closing such opening. All of these parts preferably are made of transparent plastic material and define respectively a lower chamber 54 of substantial size, an intermediate chamber 55 of substantial size and an upper chamber 56, within which the operation of the milker can be viewed through the transparent walls of such parts.

The lower chamber 54 is divided from the intermediate chamber 55 by a rigid divider disk 57 having in its central portion an aperture 58 affording communication between these chambers. The upper edge of the bowl 50 and the lower edge of the domed cover 51 have mating outwardly projecting circumferential flanges which match when the cover and base are assembled. The circumference of the divider has in it a groove in which a sealing ring 59 is received of a size to be clamped between the mating flanges of the cover and base. When such cover and base are assembled with their flanges in registry and the divider sealing ring between them, such flanges can be drawn together and clamped in sealed relationship to each other and to the divider 57 by a circumferential clamping ring 6 of channel-shaped cross section. The flanges of such ring flare generally complementally to the composite outward taper of the outer surfaces of the base and cover edge flanges. Such clamp ring can be contracted circumferentially by turning the handle 61 of a tensioning screw device 60 connecting the overlapping ends of the ring.

The intermediate chamber 55 and the upper chamber 56 within the cover and cap, respectively, of the header are separated by a very flexible elastomer diaphragm 62. The edge portion of such diaphragm is clamped between such cover and cap to close the opening 52 in the top of the cover, as shown in FIGURES 2 and 4. The cover 51 has a flange 63 projecting inwardly from its upper edge and having a shoulder 64 around the base of such flange to form an annular recess 65. The upper side of flange 63 therefore forms a ledge on which the peripheral portion of the diaphragm 62 is supported. The lower edge portion of the cap 53 has an outwardly extending flange of a size to seat on the edge portion of the diaphragm 62 within the recess 65 formed by the shoulder 64. The cap can be secured in position clamping the diaphragm 62 in place by a bail 66 having its ends pivoted in the walls of cover 51 and engaged in grooves 67 formed in the top of the cap.

The nipple 22 connected to the source of steady vacuum 3 is secured in the bowl base 50 of the milker, as shown in FIGURES 2 and 3. Preferably the nipples 13 connected to the teat cups 1 within the liner 10 are mounted in the cover 51 of the milker. The nipples 15 connected to the outer connections of the teat cups communicating with the annular spaces between the shells 1 and the liners 10 are mounted in the circumferential wall of the cap 53. In addition, the nipple 41 connected to the vacuum pulsator is mounted in the cap wall. All of these nipples may be of the same material and general type of construction. It is necessary that such material be noncorrodible and of sanitary character. A preferred material for this purpose is nylon and a satisfactory material is stainless steel.

As shown in FIGURES 2, 5 and 6, the apertures through the walls of the base 50, cover 51 and cap 53 through which the nipples 22, 13, 15 and 41 extend may be flared inwardly and the root portions of the nipples can be tapered outwardly substantially correspondingly. Such root portions of the nipples also have end flanges which prevent the nipples from being pulled outwardly through the apertures in the walls of the milker and serve as stops. At the small ends of the tapered portions of the nipples external threads are provided on the nipples onto which nuts can be screwed to bear against the exteriors of the milker walls for drawing the nipples outward. The tapered portions of the nipples are thus drawn into increasingly tight wedging engagement with the walls of the tapered apertures in the milker until the end flanges of the nipples engage the inner sides of the milker walls to interrupt further outward movement of the nipples. The root portions of the nipples are thus clamped tightly to the walls of the milker and are sealed relative to such walls.

Because the steady vacuum 3 can communicate through the nipple 22, lower milker chamber 54 and the aperture 58 of divider 57 with the intermediate milker chamber 55, and the pulsating vacuum source 4 can communicate through the nipple 41 with the upper milker chamber 56, it is desirable for the chambers 55 and 56 to be sealed completely from each other. Consequently, it is preferred to provide sharp annular ribs on the lower surface of the flange of cap 53, as shown in FIGURE 3, which will bite into the elastomer material of which the flexible diaphragm 62 is made so as to effect a seal between the cap and the diaphragm. Similarly, the upper surface of the inwardly projecting cover flange 63 can be provided with sharp annular ribs to bite into the lower side of the peripheral portion of diaphragm 62 for effecting a seal between the edge portion of such diaphragm and the chamber 55 within cover 51. Such diaphragm not only functions to constitute a partition between the intermediate chamber 55 and the upper chamber 56 of the milker, however, but also constitutes a supporting and actuating element for a valve 7, which is mounted in a position for covering the central opening 58 in divider 57.

The valve 7 preferably is in the form of a disk mounted on a valve stem 70. The lower portion of this valve stem is reduced to form a tip portion 71, the lower end of which is received in a valve guide cup 72 upstanding from the bottom of the bowl base 50. A hole 73 in such lower valve stem guide provides for drainage from such cup of any liquid which may seep down into the cup alongside the valve stem tip 71. The reduction in valve stem size at the root end of the valve stem tip provides a shoulder against which the valve disk 7 can seat. Such valve disk 7 is of a diameter less than the diameter of the cover aperture 52 preferably, so that the valve assembly can be removed and replaced through such cover aperture, if desired, without disassembling the cover 51 from the base 50.

The upper portion of the valve stem 70 is divided into two parts, as shown in FIGURE 2. The adjacent ends of such parts are formed as a projection and a socket which are complemental and fit together so that the projection will extend through a hole in the center of the diaphragm 62. The outer portions of these stem parts will clamp the central portion of the diaphragm tightly between them when they are secured together by the axially extending screw 74. Preferably the diaphragm is stiffened adjacent to the valve stem by a larger upper disk 62′ and a smaller lower disk 62″. Such stiffener assists in breaking the valve away from its seat when an upward force is applied to the diaphragm. The diaphragm should be of a diameter slightly greater than the diameter of shoulder 65 so that the diaphragm can snap between an upwardly deflected valve open position and a downwardly deflected valve closed position. Also, the action of the diaphragm is preferably to snap the valve downward toward closed position from a central position to reduce the access of strong suction to the teat cups.

The upper end of the valve stem 70 fits slidably in an upper guide cup 75 formed within the cap 53 and projecting downward. The valve stem is of a length such that when the valve disk 7 is seated on the divider 57 covering the valve aperture 58 the upper end of the valve stem will not move downward out of the cup 75. Conversely, when the valve stem is in its uppermost position, shown in FIGURE 4, the lower end of the valve stem tip will not be withdrawn upward completely from the lower valve guide cup 72.

In operation of the milking apparatus, when the vacuum pulsator 4 acts to produce suction within the upper chamber 56, such suction will act on the upper side of diaphragm 62 and will be transmitted through the nipples 15 and tubes 14 to the space between the liner 10 and the shell 1 of each teat cup. Such suction will be produced in the upper chamber of the milker at the time that the valve stem 70 is in its lower position so that the valve disk 7 covers the aperture 58 in divider 57. At this time a steady vacuum will be applied to the lower chamber 54 tending to hold the valve 7 closed. It is preferred, however, that even when the valve is thus closed limited communication will be afforded between the lower chamber 54 and the intermediate chamber 55 of the milker through a ring of small bleed apertures 76, which may be approximately 1/8 of an inch in diameter and there may be 8 of them. Air passing from intermediate chamber 55 to lower chamber 54 through the small apertures 76 will be provided principally from the portions of the teat cups 1 within the liners 10, but one or more supplemental air supply apertures 51′, such as a hole about 1/64 of an inch in diameter, may be provided through the wall of the cover 51. Also one or more supplemental air supply holes 50′ are provided in the base 50, such as a hole 1/16 of an inch in diameter, for supplying scavenging air to assist the suction in duct 21 to scavenge the milk from the lower chamber 54 to the milk receptacle 2.

At the beginning of a milking operation the teat cups will be connected to the milker by the tubes 12 and 14, and this milker will be connected to the milk container 2 by the tube 21, which in turn is connected by the conduit 30 to the source 3 of steady vacuum. The cap 53 will be connected by nipple 41 to the vacuum pulsator 4. With the valves 31 and 42 in open position the teat cups are then applied to the teats of a cow. These cups may simply be moved upward over the teats to apply them while the milker 5 is being supported by hand. Prior to such application, because the portions of the teat cups within the liners 10 are unobstructed for flow of air through the teat cups, tubes 12 and intermediate chamber 55, the pressure in such intermediate chamber will be near atmospheric even though valve 7 is open to establish communication through the aperture 58 and lower chamber 54 to the steady vacuum source 3. The air pressure in the upper milker chamber 56 will be considerably lower each time the pulsator 4 acts to apply a suction to this chamber.

As soon as the teat cups are applied to the teats the access of atmospheric air to the intermediate chamber 55 will be greatly reduced. Suction will then be applied to the intermediate chamber from the conduit 21 and lower chamber 54 through the valve disk holes 76. Such suction applied to the lower side of diaphragm 62 will largely balance the suction applied through intermittent vacuum line 40 to the upper side of such diaphragm. The valve 7 will therefore tend to remain closed until the valve holes 76 are more or less sealed by milk from the teat cups 1. Air entering the teat cups and aperture 51′ will then increase the pressure on the lower side of the diaphragm over that on its upper side to raise the diaphragm and open the valve. As the valve 7 is then opened periodically by the suction in the upper chamber 56 to produce an intermittent strong vacuum in the intermediate chamber 55 and the interior of the teat cups 10, the milking operation will proceed.

It is preferred that the duration of the vacuum produced by the pulsator 4 be approximately one second, and that such vacuum be cut off for approximately one-half of a second. When the vacuum is cut off by the pulsator 4 air will be admitted through the tube 40 to the upper chamber 56 of the milker so that it will press diaphragm 62 down in opposition to the relatively low air pressure on the underside of such diaphragm, coupled with the gravitational effect of the weight of the valve 7 and valve stem 70 tending to move the valve toward closed position. Even when the valve is closed, however, sufficient air will be drawn through the apertures 76 to reduce the pressure within the intermediate chamber 55 and the interior of the teat cups to approximately 5 inches of mercury. The differential between such vacuum and the vacuum of approximately 15 inches of mercury in the upper chamber 56 when suction is applied to it by the pulsator 4 will, however, be sufficient to open the valve 7 quickly when suction is applied to the upper chamber.

At the same time that suction is applied to the upper milker chamber 56 it will be transmitted to the space between the outer wall 1 of each teat cup and its liner 10 through the tube 14. With such reduction in pressure in this annular space the pressure of the air within the teat cup 10 will tend to expand the liner into engagement with the wall 1. Conversely, when the suction to the upper chamber 56 is cut off the air pressure supplied to the annular space between the teat cup shell and the liner 10 through the tube 14 will tend to contract the liner around the teat.

When the teat cup is in place on the teat suction is applied to the upper milker chamber 56 within the cap 53, and simultaneously to the annular space between the shell 1 and liner 10 of each teat cup, the diaphragm 62 will lift the valve stem 70 and valve 7. Strong suction from the vacuum source 3 will then be applied through the aperture 58 of the divider 57 from the lower chamber 54 of the milker to the intermediate chamber 55 and the central portion of the teat cup. The teat cup liner 10 will thus at least be relaxed while the teat will be subjected to strong suction for drawing milk into the intermediate chamber 55 of the header. The suction applied through the milk receiver 20 during such milking period of the cycle will, of course, draw milk from the intermediate milker chamber 55 through the aperture 58 and from the lower chamber 54 of the milker through tube 21 into the milk receiver. The flow of milk from a good milking cow will, however, be sufficiently great as to cause the milk to rise in the intermediate chamber 55 during this milking period. Such chamber is sufficiently large, however, to prevent the milk from backing up through the tubes 14 to the teats at any time.

When the vacuum pulsator 4 cuts off the suction to the pulsating-vacuum chamber 56 the air pressure supplied to such chamber pressing on the diaphragm 62 will move valve 7 to closed position and simultaneously contract the liner 10 around the teat. Such contraction of the liner will not be severe, however, because of the immediate reduction in vacuum within the cup liner caused by closing of the valve 7. The suction applied to the space within the liner 10 will be reduced from approximately 15 inches of mercury to approximately 5 inches of mercury. Consequently the squeezing action of the liner on the teat during the rest period will be quite gentle, not enough to close the milk canal or appreciably impair the circulation of blood in the teat, and the teat can relax. The suction which is continued in the chamber of the teat cup within the liner 10, coupled with the gentle squeezing action around the teat, will be sufficient to retain the cup securely on the teat. The cooperation of all the teat cups will be adequate to support the milker 5 without supplemental support, such as a surcingle. During this rest period, however, the strong vacuum will be maintained in the lower chamber 54, which will draw milk from the intermediate chamber 55 down through the small holes 76 into the lower chamber and through the tube 21 to the milk reservoir 20, for reducing the amount of milk in the intermediate chamber, although such chamber probably will not be completely emptied of milk by this operation during the rest period. Even though the milk receiver should become filled completely milk will not flow upward from chamber 54 to chamber 55. The residue of milk in chamber 55 covering the valve holes 76 will also prevent passage of vapor upward into chamber 55.

Each time suction is applied to the upper chamber 56 valve 7 will be lifted in this manner to enable a strong suction to be produced in the central portions of the teat cups. The transition between a strong suction period and a rest period, during which a relatively weak suction is applied to the central portion of the teat cup, does not occur abruptly. Each complete cycle of strong suction period and rest period preferably takes about 1½ seconds, of which the strong suction period will be approximately twice as long as the rest period. In such case there will thus be about 40 complete cycles every minute, although the pulsation frequency of the pulsator 4 can be increased to a rate of as much as 120 complete cycles per minute. During the milk extraction periods the liner 10 will not be contracted around the teat so as to deter extraction of milk from it. It is important, however, that such periods of strong suction not be of prolonged duration, but alternate with periods of greatly reduced suction by the valve action described above, so as to avoid drawing an excessive amount of blood into the teat tissue.

It has been found that the alternate strong and weak suction applied to the teat cups will produce an effective stripping action near the end of the milking operation so that manual stripping after the milking apparatus has been removed is not required. When the milk flow nearly stops the suction through the valve holes 76 will increase to bring the suction in the chamber 55 more nearly equal to the suction above diaphragm 62 during the suction portions of the pulsations.

The opening of valve 76 will thus be reduced and finally the valve will stop to reduce the strength of the suction applied to the teat cups over that produced in them when the valve 7 is open. Because of the reduced suction in the teat cups it is not essential for the milking apparatus to be removed from the cow immediately after she has been milked dry.

When the milking of a particular cow has been completed and the teat cups removed from the cow valves 31 and 42 can be closed so that no suction will be produced in the header 5 or teat cups. The milker can then be disconnected from other parts of the apparatus, the bail 66 can be swung into a position to release the cap 53 which can be removed, and the diaphragm 62, valve stem 70 and valve 7 can be lifted from the milker bowl 50 and cover 51 so that any residual milk can drain through the tube 21 into the milk receiver 20. The nipple 22 can then be disconnected from the tube 21, the bowl and cover separated by removing the clamping band 6 and all the parts can easily be washed thoroughly. The entire apparatus can thus be kept in a completely sanitary condition.

Use of a milker of the present invention provides definite advantages over the conventional type of milking apparatus. In systems where a steady vacuum is applied to the teat cups at all times it is important that the pulsating suction be consistent so that the teat cups are subjected to the same degree of squeeze during each rest period. In the use of the apparatus of the present invention, on the other hand, as has been explained above, the rest period is produced by closing of a control valve and when this valve is closed the suction in the teat cup will be reduced to approximately 5 inches of mercury, even though the degree of suction in the constant vacuum line may vary to some extent. On the other hand, if the vacuum pulsator 4 suction should decrease to an extent sufficiently great so that the valve 7 would not be lifted, the teats would be subjected to only a small suction with the valve in closed position and the milking operation would be interrupted. While such interruption is undesirable it is preferable to the teats being subjected to a continuous vacuum without intermittent squeezing.

Even though the suction in the vacuum line remains substantially constant and the pulsator is in proper working order, it does not necessarily mean that the milking action of the apparatus would be the same in every instance, because more air would enter a loose-fitting cup to reduce the vacuum than in the case of a tight-fitting cup. Neither would the teat cups always operate to give a uniform squeezing action in effecting a rest period. Actually, the degree of squeezing action on the cows' teats will vary from cow to cow and from teat cup to teat cup because larger teats would be subjected to a harder squeeze than smaller ones because of the lower vacuum within the cups. Also, the material of which the teat cup liners is made can alter the severity of the squeezing action. The wall thickness and age of the liner material further affects its resiliency. In conventional types of milking apparatus, therefore, such variable factors can have an appreciable influence on the rest period caused by contraction of the liner in the teat cup. In the present apparatus contraction of the liner is not relied upon primarily to produce a rest period, but, as has been explained, such rest period results from the reduction in suction produced by closing of the valve 7.

The apparatus of the present invention is particularly advantageous for use in milking systems in which the milk is transported for some distance from the header 5 to a storage container. In order to enable such transportation of milk through a piping system to be reliable, it is necessary that a strong suction be applied to the piping system 21. In the conventional type of milking apparatus this means that the same strong suction would be applied to each individual teat cup and the air supplied to the suction line must enter the system through the mouths of the teat cups. The fit of each teat cup on each cow therefore becomes important and it is simply impossible to have even approximately complete uniformity in this regard. The transfer piping frequently is located sufficiently high to occupy an overhead position, which means that the milk must be lifted from each header through a height of 6 to 8 feet. If sufficient suction is not developed in the system, the milk simply would not be carried through the transfer pipes 21, would would greatly interfere with the milking operation.

With the present milker it is not necessary to rely on the air entering the system through the mouths of the teat cups for transporting the milk through the milk lines. For this purpose, as mentioned above, supplemental air supply apertures are provided in the upper portion of the cover 51 and in the body 50. Air may be supplied through these apertures particularly when the valve 7 is in closed position to replace the volume of the intermediate chamber 55 vacated by flow of milk from such chamber into the lower chamber 54 during the rest period. Such air supply source, independent of the teat cups, insures that the milk will be removed from the intermediate chamber 55 and carried through the transfer lines 21 during the rest periods, however tightly the teat cups may fit the particular cow.

I claim as my invention:

1. A milking machine milker comprising a body having a valve seat therein and a chamber of substantial size above said valve seat, a valve received in said chamber and reciprocable up and down relative to said valve seat for closing by said valve in its lower position, a duct in communication with said chamber and adapted to be connected to a teat cup, said body having a milk outlet below said valve seat, a steady suction duct connected to said milk outlet communicating past said valve with said chamber when said valve is raised out of engagement with said valve seat for withdrawing milk from said chamber past said valve seat, and a duct communicating with a portion of said body above said chamber and adapted to be connected to a source of intermittent suction for effecting periodic lifting of said valve upward away from said valve seat corresponding to the fluctuations in such suction source.

2. A milking machine milker comprising a body having a valve seat therein, a valve within said body above said valve seat and reciprocable up and down relative to said valve seat for closing thereof by said valve in its lower position, a duct in communication with a portion of said body above said valve seat and adapted to be connected to a teat cup, said body having a milk outlet below said valve seat, a steady suction duct connected to said milk outlet for withdrawing milk from said body, and valve-reciprocating means connected to a source of intermittent suction and to said valve and operable by such source of intermittent suction to effect periodic lifting of said valve away from said valve seat corresponding to the fluctuations in such suction source.

3. The milking machine milker defined in claim 2, in which the body is divided into a lower chamber beneath the valve seat and an upper chamber above the valve seat having an opening in its top, and a removable cap closing the top opening in said upper chamber, said valve being removable through the upper end of such upper chamber when said cap is removed.

4. The milking machine milker defined in claim 3, in which the valve-reciprocating means includes a diaphragm covering the top opening of the upper body portion, having its central portion connected to the valve and having its marginal portion clamped between the cap and the body.

5. The milking machine milker defined in claim 3, and a bail pivoted on the lower portion of the body and swingable upward over the cap for holding it in place on the upper portion of the body.

6. A milking machine milker comprising a body including a lower bowl portion defining a chamber therein, an upper domed cover portion defining a chamber therein and a clamping band securing together said upper and lower body portions, a divider clamped between said upper and lower body portions and having an aperture therein affording communication between the bowl chamber and the cover chamber, a duct connected to said cover portion and adapted to be connected to a teat cup, said lower bowl portion having a milk outlet connected thereto, a steady suction duct connected to said milk outlet, a valve in said cover chamber movable between a position closing the aperture in said divider, and an open position, and valve-operating means operatively connected to a source of intermittent suction and to said valve and operable by such source of intermittent suction to effect periodic opening and closing movements of said valve corresponding to the fluctuations in such suction source.

7. The milking machine milker defined in claim 6, in which the valve operating means includes a diaphragm connected to the valve, and means operable to subject said diaphragm to a pulsating suction.

8. A milking machine milker comprising a body including a lower bowl portion defining a lower chamber therein, an upper domed cover portion defining an intermediate chamber therein and having an opening in its top and a clamping band securing together said upper and lower body portions, a divider clamped between said upper and lower body portions and having an aperture therein affording communication between such lower chamber and such intermediate chamber, a diaphragm covering the top opening of said upper body portion, a cap covering said diaphragm and defining an upper chamber therein, a valve stem carried by said diaphragm and reciprocable up and down by upward and downward deflection of said diaphragm, a valve carried by said valve stem in a position for engaging said divider in the lower position of said valve for closing the divider aperture and raisable to open such aperture, a duct connected to said upper body portion and adapted to be connected to a teat cup, said lower body portion having a milk outlet, a steady suction duct connected to said milk outlet, and a duct connected to said cap and adapted to be connected to a pulsating suction source for altering the pressure differential on said diaphragm periodically to effect reciprocation of said valve for controlling the communication between the steady suction duct and the valve teat duct through such lower chamber, the aperture in said divider and such upper chamber.

9. A milking machine milker comprising a body defining a chamber therein having a valve seat in the lower portion of such chamber, a valve within said body chamber above said valve seat and reciprocable up and down relative to said valve seat for closing thereof by said valve in its lower position, a duct in communication with said body chamber above said valve seat and adapted to be connected to a teat cup, said body having a milk outlet below said valve seat, a steady suction duct connected to said milk outlet for withdrawing milk from said body, a pulsating suction duct connected to the upper portion of said body, and valve-reciprocating means connected to said valve an including a diaphragm having its lower surface in communication with said body chamber and its upper surface exposed to the pulsating suction communicated to said body by said pulsating suction duct to effect periodic lifting of said valve away from said valve seat corresponding to the fluctuations in such pulsating vacuum source.

10. A milking machine milker comprising a body defining a chamber therein in restricted communication with the atmosphere and having a valve seat in the lower portion of such chamber, a valve within said body chamber above said valve seat and reciprocable up and down relative to said valve seat for closing thereof by said valve in its lower position, a duct in communication with said body chamber above said valve seat and adapted to be connected to a teat cup, said body having a milk outlet below said valve seat, a steady suction duct connected to said milk outlet for withdrawing milk from said body, a pulsating suction duct connected to the upper portion of said body, and valve-reciprocating means connected to said valve and including a diaphragm having its lower surface in communication with said body chamber and its upper surface exposed to the pulsating suction duct to effect periodic lifting of said valve away from said valve seat corresponding to the fluctuations in such pulsating vacuum source.

References Cited in the file of this patent

UNITED STATES PATENTS

| 2,896,573 | Schalm et al. | July 28, 1959 |

FOREIGN PATENTS

| 105,472 | Australia | Oct. 12, 1938 |
| 789,401 | Great Britain | Jan. 22, 1958 |
| 117,465 | Russia | Feb. 6, 1959 |